United States Patent [19]
Tokoro et al.

[11] Patent Number: 6,110,983
[45] Date of Patent: Aug. 29, 2000

[54] FOAMED PARTICLES OF CROSS-LINKED ALIPHATIC POLYESTER RESINS, PROCESS FOR PRODUCING THEM, AND FOAMED MOLDINGS OBTAINED FROM THEM

[75] Inventors: Hisao Tokoro, Utsunomiya; Satoru Shioya, Tochigi-ken; Mitsuru Shinohara, Utsunomiya, all of Japan

[73] Assignee: JSP Corporation, Japan

[21] Appl. No.: 09/424,066

[22] PCT Filed: May 22, 1998

[86] PCT No.: PCT/JP98/02259

§ 371 Date: Nov. 18, 1998

§ 102(e) Date: Nov. 18, 1999

[87] PCT Pub. No.: WO98/54244

PCT Pub. Date: Dec. 3, 1998

[30] Foreign Application Priority Data

May 26, 1997 [JP] Japan ................................. 9-151627

[51] Int. Cl.$^7$ ........................................ C08J 9/00
[52] U.S. Cl. .............. 521/56; 522/60; 522/162; 522/169; 521/50; 521/50.5; 521/82
[58] Field of Search ............ 522/60, 162, 165; 521/50, 50.5, 56, 82

[56] References Cited

U.S. PATENT DOCUMENTS

| | | | |
|---|---|---|---|
| 4,769,393 | 9/1988 | Kuwabara et al. | 521/59 |
| 5,218,018 | 6/1993 | Tominaga et al. | 523/412 |
| 5,543,438 | 8/1996 | Shibayama et al. | 521/140 |
| 5,939,180 | 8/1999 | Kobayashi et al. | 428/304.4 |

FOREIGN PATENT DOCUMENTS 0569143  11/1993  European Pat. Off. .

*Primary Examiner*—Samuel A. Acquah
*Attorney, Agent, or Firm*—Loruso & Loud

[57] ABSTRACT

Foamed and expanded beads of a crosslinked aliphatic polyester resin having a gel fraction of at least 5% by weight. The expanded beads may be obtained by crosslinking beads of a non-crosslinked aliphatic polyester resin with a crosslinking agent including an organic peroxide to obtain crosslinked resin beads having a gel fraction of at least 5% by weight, and then expanding the crosslinked resin beads. A biodegradable foamed article may be obtained by thermally foaming the crosslinked, expanded aliphatic polyester resin beads in a mold.

8 Claims, No Drawings

FOAMED PARTICLES OF CROSS-LINKED ALIPHATIC POLYESTER RESINS, PROCESS FOR PRODUCING THEM, AND FOAMED MOLDINGS OBTAINED FROM THEM

TECHNICAL FIELD

This invention relates to formed and expanded beads of a crosslinked aliphatic polyester resin, a method for the production thereof and a foamed molding obtained therefrom.

BACKGROUND ART

Foamed plastic moldings, which are featured in their lightness in weight, elasticity, cushioning property, heat insulating property and moldability, are recently used in large amounts mainly as packing receptacles and cushioning materials. These foamed plastic moldings, however, pose a problem of pollution of natural environment by disposal thereof. To cope with this problem, biodegradable foamed moldings are proposed. EP-A-569143 discloses a method for obtaining a molded article in which biodegradable aliphatic polyester beads are impregnated with a blowing agent, followed by heat molding in a mold cavity. The foamed molding obtained with this method, however, undergoes considerable shrinkage during the molding step and has poor dimensional stability.

The present invention has been made in view of the problem of the above conventional technique and has as its prime object the provision of expanded beads of an aliphatic polyester which can afford foamed articles of the aliphatic polyester having excellent dimensional stability, heat resistance, cushioning property and mechanical property as well as biodegradability.

DISCLOSURE OF THE INVENTION

In accordance with one aspect of the present invention, there is provided foamed and expanded beads of a crosslinked aliphatic polyester resin having a gel fraction of at least 5% by weight.

In another aspect, the present invention provides a method for the production of foamed and expanded beads of a crosslinked aliphatic polyester resin, comprising the steps of crosslinking beads of a non-crosslinked aliphatic polyester resin with a crosslinking agent comprising an organic peroxide to obtain crosslinked resin beads having a gel fraction of at least 5% by weight; and expanding said crosslinked resin beads.

In a further aspect, the present invention provides a molded article of foamed and expanded beads of a crosslinked aliphatic polyester resin, having a gel fraction of at least 5% by weight.

A non-crosslinked aliphatic polyester resin of which non-crosslinked resin beads are formed is a resin having an aliphatic ester in the main chain thereof in an amount of at least 60 mole %, preferably 80–100 mole %, more preferably 90–100 mole %. Examples of the aliphatic polyester resins include polycondensation products of hydroxyacids such as hydroxybutyric acid, ring open polymerization products of lactones such as polycaprolactone, and polycondensation products between a glycol and a dicarboxylic acid such as polybutylene succinate. Additionally, the aliphatic polyester resin may be a product obtained by treating the above polymer with a coupling agent for increasing the molecular weight thereof, a blend of a plurality of the above polymers or a copolymer of the above polymer with a carbonic diester.

Examples of the coupling agents include diisocyanates such as 2,4-tolylenediisocyanate, diphenylmethanediisocyanate, 1,5-naphthylenediisocyanate, xylylenediisocyanate, hydrogenated xylylenediisocyanate, hexamethylenediisocyanate and isophoronediisocyanate; and aryl carbonates such as diphenyl carbonate, ditolyl carbonate, bis(chlorophenyl) carbonate and m-cresyl carbonate.

Particularly preferred aliphatic polyester resins are products obtained by polycondensing one or more glycols having not more than 4 carbon atoms with one or more aliphatic dicarboxylic acids having not more than 4 carbon atoms. The aliphatic polyester resin may contain other resins or rubbers, if desired. The aliphatic polyesters disclosed in the above-mentioned EP-A-569143 may be suitably used for the purpose of the present invention.

The melt viscosity of the aliphatic polyester resin is preferably $1 \times 10^2 - 1 \times 10^5$ Pa·s, more preferably $5 \times 10^2 - 5 \times 10^3$ Pa·s, at 190° C. and at a rate of shear of 100 sec$^{-1}$. When the melt viscosity is lower than $1 \times 10^2$ Pa·s, the closed cell content of the resulting expanded beads is so small that there is a tendency that it is difficult to obtain a suitable foamed molding. When the melt viscosity is greater than $1 \times 10^5$ Pa·s, foams are unable to grow in the molding step of the expanded beads so that there is a tendency that it is difficult to obtain a practically usable foamed molding.

The "melt viscosity at 190° C. and at a rate of shear of 100 sec$^{-1}$" referred to in the present specification is determined as follows:

As a melt viscosity measuring device, RHEOVIS2100 manufactured by CEAST Corporation is used. A melt of a sample resin is extruded through an orifice (orifice inside diameter: 1.0 mm; orifice length: 10 mm) mounted on a tip of the device at a resin temperature of 190° C. and at a rate of shear of 100 sec$^{-1}$ to measure the melt viscosity.

In the production of foamed and expanded beads (hereinafter referred to simply as "expanded beads") according to the present invention, beads of the above polyester resin (non-crosslinked resin beads) are first prepared. Such beads may be produced by any conventional method. For example, a polyester resin is melted and kneaded with an extruder and then extruded into strands. The strands are cooled and then cut into a desired length or are first cut into a suitable length and then cooled to obtain non-crosslinked resin beads. The weight of one non-crosslinked resin bead may be 0.05–10 mg, preferably 1–4 mg. The weight of the beads greater than the above upper limit is likely to cause a difficulty in uniformly crosslinking the resin inside the beads. It is difficult to produce resin beads having a weight below the above lower limit.

The non-crosslinked resin beads may be colored by inclusion of a pigment or a dye such as of black, gray or brown. By using resin beads obtained from a colored resin, colored expanded beads and moldings may be obtained. If necessary, an inorganic material, such as talc, calcium carbonate, borax, zinc borate or aluminum hydroxide, may be previously incorporated into the non-crosslinked resin beads for the purpose of adjusting the cells and of increasing expansion ratio. In the case of incorporation of additives such as a pigment, a dye and an inorganic material, it is possible to directly knead the additive together with the polyester resin. However, it is generally preferred that a master batch of the additive be prepared and a portion thereof be kneaded with the polyester resin for reasons of improved dispersibility. The amount of the pigment or dye is generally 0.001–5 parts by weight per 100 parts by weight of the polyester resin, though the amount varies with the kind of the color.

The non-crosslinked resin beads are then crosslinked. The crosslinking may be performed by dispersing the non-crosslinked resin beads in a dispersing medium within a closed vessel, which is then heated after the addition of a crosslinking agent and, if necessary, a crosslinking aid. Any dispersing medium may be used as long as the non-crosslinked resin beads are insoluble therein. Water is preferably used.

A melt-adhesion preventing agent may be incorporated into the dispersing medium for preventing melt-adhesion of the resin beads during crosslinking. Any solid particle may be used as the melt-adhesion preventing agent, as long as it is insoluble in the dispersing medium and is not fused upon being heated. Inorganic particles are particularly preferably used. Suitable inorganic melt-adhesion preventing agents include powders of kaolin, talc, mica, aluminum oxide, titanium oxide or aluminum hydroxide. As the dispersing aid, an anionic surfactant such as sodium dodecylbenzenesulfonate or sodium oleate may be suitably used. The melt-adhesion preventing agent preferably has an average particle diameter of 0.001–100 $\mu$m, more preferably 0.001–30 $\mu$m and is preferably used in an amount of 0.01–10 parts by weight per 100 parts by weight of the non-crosslinked resin beads. The surfactant is preferably used in an amount of 0.001–5 parts by eight per 100 parts by weight of the non-crosslinked resin beads.

As the crosslinking agent, there may be used any conventional organic peroxide such as a diacylperoxide (e.g. lauroylperoxide, stearoylperoxide or benzoylperoxide), a peroxydicarbonate (e.g. bis(4-t-butylcyclohexyl) peroxydicarbonate, diisopropylperoxydicarbonate) or a peroxidiester (e.g. t-butylperoxyisobutylate). The use of a crosslinking agent having a decomposition temperature that is lower than the melting point of the polyester resin is particularly preferred. The decomposition temperature herein is a temperature providing 1 hour of a half life of the crosslinking agent. The use of an organic peroxide having excessively high decomposition temperature will require so high a heating temperature and so long a heating time for heating the polyester resin beads in water that there is a fear that the polyester resin be hydrolyzed.

It is preferred that the organic peroxide be used in conjunction with a crosslinking aid which may be a compound having at least two, preferably 2–3 unsaturated bonds (double bonds, triple bonds). Such unsaturated compound crosslinking agent may be an acrylate or methacrylate compound such as ethyleneglycol diacrylate, polyethyleneglycol diacrylate, trimethylolpropane triacrylate, tetramethylolmethane triacrylate, tetramethylolmethane tetraacrylate, ethyleneglycol dimethacrylate, trimethylolpropane trimethacrylate or allyl methacrylate; an allyl ester of cyanuric acid or isocyanuric acid such as triallyl cyanurate or triallyl isocyanurate; an allyl ester of a carboxylic acid such as triallyl trimellitate, triallyl trimesate, triallyl pyromellitate, triallyl benzophenonetetracarboxylate, diallyl oxalate, diallyl succinate or diallyl adipate; a maleimide compound such as N-phenylmaleimide or N,N'-m-phenylenebismaleimide; a polymer having double bonds such as 1,2-polybutadiene; or a compound having at least two triple bonds such as dipropargyl phthalate, dipropargyl isophthalate, tripropargyl trimesate, dipropargyl itaconate or dipropargyl maleate. The use of a combination of an organic peroxide with a divinyl compound, especially the use of a combination of benzoylperoxide with divinylbenzene is particularly preferred.

The organic peroxide is used in an amount of 0.01–10 parts by weight, preferably 0.1–5 parts by weight, per 100 parts by weight of the non-crosslinked resin beads. The unsaturated compound crosslinking agent is used in an amount of 0.001–10 parts by weight, preferably 0.01–2 parts by weight, per 100 parts by weight of the non-crosslinked resin beads.

The crosslinking temperature T (° C.) is generally a temperature which is lower by about at most 65° C. than the melting point MP (° C.) of the polyester resin beads (T$\leq$MP–65° C.). For example, in the case of the polyester resin beads made of a polyester (mp: 113° C.) composed of 1,4-butanediol and succinic acid, the crosslinking temperature is 50–140° C., preferably 90–120° C. As a pretreatment step for the crosslinking step, a step of impregnating polyester resin beads with an organic peroxide crosslinking agent at a temperature lower than the crosslinking temperature may be carried out, if necessary.

The crosslinked resin beads thus obtained have a gel fraction of at least 5% by weight, preferably 30–80% by weight, more preferably 40–70 by weight. When the gel fraction is lower than 5% by weight, it is impossible to obtain a foamed molding having good dimensional stability, because there is caused a considerable shrinkage in the foamed molding produced by filling a mold cavity with expanded beads (obtained by expanding the crosslinked resin beads) and heating the expanded beads with a heating medium for the foaming (called secondary foaming) thereof and for the fuse bonding thereof to each other. When the gel fraction is higher than 80% by weight, there is a possibility that high grade foamed moldings are not obtainable because secondary foamability and adhesion of the expanded beads become poor. The gel fraction of crosslinked resin beads may be controlled by the amount and kind of a crosslinking agent, a crosslinking temperature, etc.

The gel fraction referred to in the present specification is defined as follows.

A sample (about 1 g; crosslinked resin beads, expanded beads or foamed molding) is placed in a 150 ml flask together with 100 ml of chloroform. The mixture is heated under reflux for 8 hours. The heat-treated mixture is then filtered with a suction filtration device having a 200 mesh wire net. The material remaining on the wire net after the filtration treatment is dried in an oven at 80° C. for 8 hours under a reduced pressure. The weight W1 of the dried material thus obtained is measured. The gel fraction is a percentage by weight ((W1/W2)×100%) of the weight W1 based on the sample weight W2.

As a method of crosslinking the non-crosslinked resin beads, other methods, such as electron beam crosslinking method and silane crosslinking method, than the above method using an organic peroxide crosslinking agent can be used.

The crosslinked resin beads are then expanded by any suitable known method. One preferred expansion method includes dispersing crosslinked resin beads in a dispersing medium within a closed vessel in the presence of a blowing agent; heating the dispersion to soften the crosslinked resin beads and to impregnate the beads with the blowing agent; and then, while maintaining the pressure within the vessel higher than the vapor pressure of the blowing agent, opening one end of the vessel to simultaneously discharge the beads and the dispersing medium to an atmosphere (generally atmospheric pressure) lower than the pressure within the vessel, thereby expanding the beads. Other methods may also be adopted such as a method wherein crosslinked resin beads are impregnated with a blowing agent in a closed vessel to obtain expandable beads which are then taken out of the vessel and heated so that the resin beads are softened and expanded; and a method wherein resin beads which have been kneaded with a decomposition-type blowing agent are heated at a temperature higher than the decomposition point of the blowing agent and expanded. The expanded beads obtained by expansion of crosslinked resin beads have the same gel fraction as that of the crosslinked resin beads.

Alternatively, expanded, crosslinked resin beads may be obtained by expanding non-crosslinked resin beads and then crosslinking the thus obtained expanded beads by an electron beam crosslinking method, etc.

As the blowing agent used for preparing the above expanded beads, there may be used conventional one such as a volatile blowing agent, e.g. propane, butane, hexane, cyclobutane, cyclohexane, trichlorofluoromethane, dichlorodifluoromethane, chlorofluoromethane, trifluoromethane, 1,2,2,2-tetrafluoromethane, 1-chloro-1,1-difluoroethane, 1,1-difluoroethane or 1-chloro-1,2,2,2-tetrafluoroethane; or an inorganic gas blowing agent, e.g. nitrogen, carbon dioxide, argon or air. Above all, the use of an inorganic blowing agent, particularly nitrogen, carbon dioxide or air, is preferred for reasons of cheapness and prevention of the ozone layer.

In the above expansion method, the volatile blowing agent is used in an amount of 2–50 parts by weight per 100 parts by weight of the crosslinked resin beads. The inorganic gas blowing agent is used in an amount so that the closed vessel has a pressure in the range of 10–60 kgf/cm$^2$G. The amount of the blowing agent is suitably selected with the consideration of a relationship between the bulk density of the desired expanded beads and the blowing temperature at which the expansion is carried out. The temperature at which the crosslinked resin beads are impregnated with the blowing agent is suitably at least (MP−20)° C. where MP is a melting point of the crosslinked resin beads. The temperature suitable for expanding the crosslinked resin beads becomes high as the gel fraction thereof increases. Generally, the expansion temperature is in the range of not lower than (MP−25)° C. but not higher than (MP+50)° C. where MP is a melting point of the crosslinked resin beads.

The expanded beads thus obtained generally have a bulk density of 0.015–0.6 g/cm$^3$ and an average cell diameter of 0.05–0.5 mm.

The expanded beads can be further foamed and inflated when heated. The foaming ratio varies with the heating temperature and the content of the blowing agent. The expanded beads having such characteristics are utilized for the formation of foamed moldings.

A foamed molding may be prepared by placing and heating the expanded beads in a mold. As a result of the heating, the expanded beads are fuse-bonded to each other to form a foamed molding of a unitary structure. As the mold, any customarily employed mold may be used. As the heating means, steam is generally used. The heating temperature is such that surfaces of the expanded beads are fused while preventing the cell structure of the expanded beads from being destroyed. The thus obtained foamed molding has the same gel fraction as that of the expanded beads. The foamed molding may have any desired shape such as a container, a plate, a cylinder, a column, a sheet or a block.

The foamed molding of the present invention has a very small shrinkage. The shrinkage is 10% or less, preferably 5% or less. Thus, the foamed molding is excellent in dimensional stability. Especially, the shrinkage of the foamed molding is extremely small when the gel fraction of the crosslinked resin beads is at least 30% by weight. In the case of such a gel fraction, the expanded beads exhibit both excellent heat bonding property and biodegradability. Therefore, it is possible to obtain, from the expanded beads, a biodegradable molding having excellent mechanical strengths such as compression strength, bending strength and tensile strength.

The term "biodegradable" used in the present specification is intended to refer to a case of a sample (crosslinked resin beads, expanded beads or foamed molding) which shows a biodegradation (%) of at least 60% when measured 28 days after the commencement of the following test according to the soil suspension method:

Soil Suspension Method (JIS K6950 (1994): a method in which a soil suspension liquid is substituted for an activated sludge in "Activated Sludge Method" according to Testing Method for Aerobic Biodegradability by Activated Sludge)

(1) Soil: A mixture of 6 kinds of soil collected in the following No. 1 to No. 6 places is used.

No. 1: National Institute of Bioscience and Human Technology at Tsukuba-shi, Ibaraki-ken No. 2: National Institute of Bioscience and Human Technology at Tsukuba-shi, Ibaraki-ken No. 3: Tsukuba-shi, Ibaraki-ken No. 4: Mikuni-cho, Fukui-ken No. 5: Unatsuki-cho, Toyama-ken No. 6: Tsuruga-shi, Fukui-ken (2) Preparation of Sample: A sample is ground at −100° C. for 15 minutes using a freeze grinder and then sieved to adjust the particle size thereof to 250 μm or less.

(3) Inorganic Salt Culture Medium: The same inorganic salt culture medium as described in JIS K 6950 (1994) is used except that the amount of $NH_4Cl$ of a buffer solution is changed to 2.5 g.

(4) Preparation of Soil Suspension Liquid: The above soil (150 g; dry weight) is mixed with stirring with 3 liters of the inorganic salt culture medium for 30 minutes. The mixture is allowed to stand quiescently for 30 minutes. The resulting supernatant is used.

(5) Biodegradability Test Method: A sample (30 mg) is mixed with 300 ml of the soil suspension liquid and the mixture is cultured. During culture, the oxygen consumption of the suspension liquid is continuously measured using a BOD meter. The biodegradation BD of the sample is expressed by the following formula:

$$BD=[(Ms-Mc)/Mt]\times 100(\%)$$

wherein Ms represents a BOD value (mg) of the measured suspension liquid, Mc represents a BOD value (mg) of a control (soil suspension liquid obtained without the sample) and Mt is a theoretical oxygen demand (mg) of the sample.

EXAMPLE

The following examples will further illustrate the present invention. "Parts" are by weight.

Examples 1–3

100 Parts of an aliphatic polyester resin (BIONORE #1003 manufactured by Showa High Polymer Co., Ltd.; major components: 1,4-butanediol and succinic acid; melting point: 113° C.; MFR(190° C.): 8 g/10 min; melt viscosity at a rate of shear of 100 sec$^{-1}$: 950 Pa·s) were blended in a dry state with 0.2 part of aluminum hydroxide and the blend was melted and kneaded with an extruder. This was then extruded into strands, which were subsequently cut to obtain non-crosslinked resin beads each having a diameter of 1.3 mm, a length of 1.3 mm and a weight of about 2 mg.

The non-crosslinked resin beads (100 parts) were then charged into a 5 liter-autoclave together with 300 parts of water, 1.5 parts of kaolin, 0.02 part of sodium dodecylbenzenesulfonate, 2 parts of Nyper FF (manufactured by Nippon Yushi Co., Ltd.; benzoyl peroxide; purity 50%) and a quantity (as shown in Table 1) of DVB-570 (manufactured by Shin-Nittetu Chemical Co., Ltd.; divinylbenzene; purity: 57%). The mixture was heated with stirring to 105° C., maintained at that temperature for 60 minutes and cooled to 30° C. to obtain crosslinked resin beads having a gel fraction as shown in Table 1.

The crosslinked resin beads (100 parts) were then charged into a 5 liter-autoclave together with 300 parts of water, 1 part of kaolin and 0.02 part of sodium dodecylbenzenesulfonate. The mixture was heated to an expansion temperature and carbon dioxide was fed to the autoclave until the inside pressure thereof reached a pressure as shown in Table 1, so that the resin beads were impregnated with carbon dioxide. One end of the autoclave was then opened, while introducing a nitrogen gas into the autoclave to maintain the inside pressure thereof, to discharge the contents therein to the ambient pressure, thereby expanding the crosslinked resin beads. The bulk density and the average cell diameter of the expanded beads are shown in Table 1.

The thus obtained expanded beads were aged at 60° C. for 24 hours, filled in a mold having a size of 208×208×25 mm and then molded therein with heating at a steam pressure as shown in Table 1. The molding thus obtained was aged at 60° C. for 24 hours under an ambient pressure. The apparent density, shrinkage and biodegradability of the foamed molding were evaluated to give the results summarized in Table 1.

Comparative Examples 1 and 2

The non-crosslinked resin beads (100 parts) shown in Example 1 were charged into a 5 liter-autoclave together with 300 parts of water, 1.5 parts of kaolin and 0.02 part of sodium dodecylbenzenesulfonate. The mixture was heated to an expansion temperature and carbon dioxide was fed to the autoclave until the inside pressure thereof reached a pressure as shown in Table 1, so that the resin beads were impregnated with carbon dioxide. In the same manner as that in the above Examples, one end of the autoclave was then opened, while introducing a nitrogen gas into the autoclave, to discharge the contents therein to the ambient pressure, thereby expanding the resin beads. The bulk density and the average cell diameter of the expanded beads are shown in Table 1.

The thus obtained expanded beads were aged at 60° C. for 24 hours, filled in a mold having a size of 208×208×25 mm and then molded therein with heating at a steam pressure as shown in Table 1. The molding thus obtained was aged at 60° C. for 24 hours under an ambient pressure. The characteristics of the moldings are summarized in Table 1.

Example 4

Example 1 was performed in the same manner as described except that an aliphatic polyester resin (BIONORE #1001 manufactured by Showa High Polymer Co., Ltd.; major components: 1,4-butanediol and succinic acid; melting point: 113° C.; MFR(190° C.): 1.8 g/10 min; melt viscosity at a rate of shear of 100 sec$^{-1}$: 1,950 Pa·s) having MFR different from that of the polyester resin in Example 1 was used and that the crosslinking conditions shown in Table 1 were used.

The properties of the expanded beads and the molding obtained therefrom are shown in Table 1.

In the above Examples and Comparative Examples, the shrinkage of the molding was calculated as follows (between two shrinkage values in the longitudinal and lateral directions, a greater value was used):

$$R = [(B-A)/B] \times 100 (\%)$$

R: Shrinkage of the molding
A: Length of the molding aged at 60° C. for 24 hours immediately after the molding step
B: Length of the mold corresponding to A In the above Examples and Comparative Examples, the biodegradability of the moldings was evaluated as follows:

A molding is immersed in water at 24° C. in the presence of microorganisms. The reduction of the weight of the molding with time was measured. The biodegradability is expressed in terms of the number of days required for the weight thereof to decrease to 50%.

In the above Examples and Comparative Examples, the bulk density Bd (g/cm$^3$) was measured as follows:

In a measuring cylinder, at least 500 expanded beads were placed to determine the volume V (cm$^3$) of the beads from the graduation of the cylinder. The bulk density Bd is calculated as follows:

$$Bd = W/V$$

wherein W (g) is a total weight of the expanded beads placed in the cylinder.

In the above Examples and Comparative Examples, the average cell diameter of the expanded beads was measured as follows:

An expanded bead was cut into halves. The cut surface was observed to measure the maximum diameter d1, d2 . . . dn (mm) of each of the total n-number of cells, from which an arithmetic mean D was calculated (D=(d1+d2 . . . +dn)/n). Similar procedure was performed for 30 arbitrary expanded beads. The average cell diameter is an average of D of the 30 beads (dividing a total of the average D of the beads by 30).

In the above Examples and Comparative Examples, the apparent density BM (g/cm$^3$) was determined by dividing the weight WM (g) of the molding by the volume VM (cm$^3$) determined from the outer dimension of the molding (BM=WM/VM).

The moldings of the expanded beads in Examples 1–4, which have a crosslinked structure, show a shrinkage of 5% or less and thus have high practical values. The biodegradability (50% weight reduction) of them is 38 days or less and is excellent. In contrast, the moldings of the expanded beads in Comparative Examples 1–2 show a shrinkage of more than 10% and, thus, are not suitable. Additionally, the bulk density of the expanded beads of Comparative Examples highly depends upon the temperature in the expansion for the preparation of the expanded beads, so that it was difficult to control the expansion ratio in the production of the expanded beads.

The gel fraction of the expanded beads in each of Examples 1–4 was the same as that of the moldings obtained therefrom.

TABLE 1

|  | Example | | | | Comparative Example | |
|---|---|---|---|---|---|---|
|  | 1 | 2 | 3 | 4 | 1 | 2 |
| Melt viscosity of Polyester Resin (Pa · s) | 950 | 950 | 950 | 1,920 | 950 | 950 |
| Crosslinked Resin Beads | | | | | | |
| Nyper FF (part) | 2 | 2 | 2 | 2 | — | — |
| DVB-570 (part) | 0.3 | 0.5 | 1.0 | 0.1 | — | — |
| Crosslinking Temperature (° C.) | 105 | 105 | 105 | 105 | — | — |
| Crosslinking Time (minutes) | 60 | 60 | 60 | 60 | — | — |

TABLE 1-continued

|  | Example | | | | Comparative Example | |
| --- | --- | --- | --- | --- | --- | --- |
|  | 1 | 2 | 3 | 4 | 1 | 2 |
| Gel Fraction (% by weight) Expanded Beads | 46.3 | 52.7 | 65.2 | 50.7 | 0 | 0 |
| Expansion Temperature (° C.) | 105 | 105 | 105 | 105 | 100.5 | 101 |
| $CO_2$ Pressure ($kg/cm^2$) | 30 | 30 | 45 | 30 | 40 | 40 |
| Bulk Density ($g/cm^3$) | 0.051 | 0.062 | 0.050 | 0.049 | 0.047 | 0.011 |
| Average Cell Diameter (mm) Molding of Expanded Beads | 0.31 | 0.29 | 0.30 | 0.30 | 0.28 | 0.30 |
| Steam Pressure ($kg/cm^2$ G) | 1.0 | 1.5 | 2.2 | 1.5 | 0.2 | 0.2 |
| Apparent Density ($g/cm^3$) | 0.061 | 0.070 | 0.057 | 0.053 | 0.060 | 0.158 |
| Shrinkage (%) | 4.8 | 4.8 | 4.8 | 4.8 | >10 | >10 |
| Biodegradability (day) | 22 | 30 | 38 | 35 | 16 | 18 |

What is claimed is:

1. Foamed and expanded beads of a crosslinked aliphatic polyester resin having a gel fraction of at least 5% by weight.

2. Foamed and expanded beads as recited in claim 1, and having a bulk density of 0.015–0.6 $g/cm^3$.

3. A method for the production of foamed and expanded beads of a crosslinked aliphatic polyester resin, comprising the steps of:

crosslinking beads of a non-crosslinked aliphatic polyester resin with a crosslinking agent comprising an organic peroxide to obtain crosslinked resin beads having a gel fraction of at least 5% by weight; and expanding said crosslinked resin beads.

4. A method as recited in claim 3, wherein said organic peroxide is used in an amount of 0.01–10 parts by weight per 100 parts by weight of said non-crosslinked aliphatic polyester resin beads.

5. A method as recited in claim 3, wherein said crosslinking agent further comprises a compound having at least two unsaturated bonds.

6. A method as recited in claim 5, wherein said compound is used in an amount of 0.001–10 parts by weight per 100 parts by weight of said non-crosslinked aliphatic polyester resin beads.

7. A method as claimed in claim 3, wherein said crosslinking agent comprises a combination of benzoyl peroxide with divinylbenzene.

8. A molded article of foamed and expanded beads of a crosslinked aliphatic polyester resin, having a gel fraction of at least 5% by weight.

\* \* \* \* \*